United States Patent
Oberzaucher et al.

(10) Patent No.: US 6,369,548 B1
(45) Date of Patent: Apr. 9, 2002

(54) VOLTAGE SWITCH-OVER DEVICE

(75) Inventors: Friedrich Oberzaucher, Wels; Georg Krenhuber, Lambach, both of (AT)

(73) Assignee: Fronius Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/701,272

(22) PCT Filed: May 27, 1999

(86) PCT No.: PCT/AT99/00132

§ 371 Date: Nov. 28, 2000

§ 102(e) Date: Nov. 28, 2000

(87) PCT Pub. No.: WO99/63649

PCT Pub. Date: Dec. 9, 1999

(30) Foreign Application Priority Data

May 29, 1998 (AT) .................................. 919/98

(51) Int. Cl.⁷ .................................................. H02J 7/00
(52) U.S. Cl. ........................................................ 320/166
(58) Field of Search .............................. 363/127, 125, 363/84, 89, 90, 81, 82; 320/166

(56) References Cited

U.S. PATENT DOCUMENTS

| | | | | |
|---|---|---|---|---|
| 4,258,304 A | * | 3/1981 | Bourke | 320/142 |
| 4,268,899 A | * | 5/1981 | Rokas | 363/61 |
| 4,384,321 A | * | 5/1983 | Rippel | 363/124 |
| 4,827,151 A | * | 5/1989 | Okado | 307/66 |
| 5,088,019 A | * | 2/1992 | Williams et al. | 363/69 |
| 5,177,677 A | * | 1/1993 | Nakata et al. | 363/89 |
| 5,461,297 A | | 10/1995 | Crawford | 320/166 |
| 5,568,035 A | * | 10/1996 | Kato et al. | 320/166 |
| 5,574,635 A | * | 11/1996 | Philippe | 363/124 |
| 5,675,483 A | * | 10/1997 | Rademaker et al. | 363/70 |
| 5,712,774 A | * | 1/1998 | Uramoto | 363/46 |
| 5,801,931 A | * | 9/1998 | Kino et al. | 363/17 |
| 5,969,481 A | * | 10/1999 | Konopka | 315/209 R |
| 6,011,704 A | * | 1/2000 | Coleman | 363/37 |
| 6,087,811 A | * | 7/2000 | Crawford et al. | 320/139 |

FOREIGN PATENT DOCUMENTS

| | | |
|---|---|---|
| EP | 0 021 714 | 1/1981 |
| EP | 0 476 278 | 3/1992 |

* cited by examiner

Primary Examiner—Peter S. Wong
Assistant Examiner—Pia Tibbits
(74) Attorney, Agent, or Firm—Collard & Roe, P.C.

(57) ABSTRACT

A voltage switch-over device comprises a first power rectifier, a second power rectifier, and a charger, the first power rectifier being connected to the charger. Mains leads connect the charger to a power supply, and a mains evaluation unit is coupled to the charger, the mains evaluation unit switchably connecting the second power rectifier to the power supply and to two consumers consisting of balanced primary modules activating at least one transformer. There is a first connection including a capacitor between the positive potential of the first power rectifier and the negative potential of the second power rectifier, and a second connection includes a capacitor between the negative potential of the first power rectifier and the positive potential of the second power rectifier, a respective one of the capacitors being arranged in an independent current circuit supplying a respective one of the consumers. A control device is connected to the consumers.

7 Claims, 4 Drawing Sheets

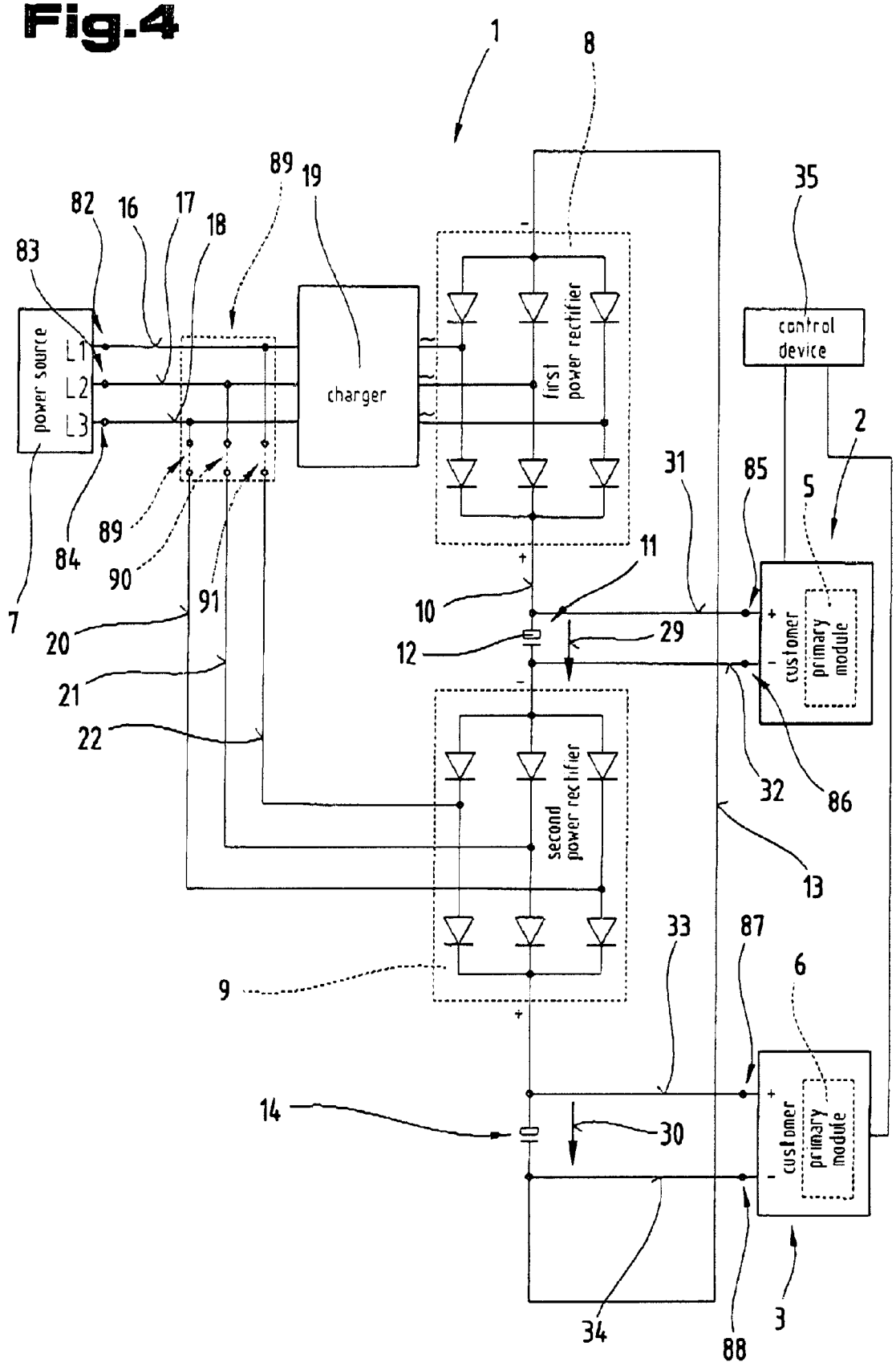

VOLTAGE SWITCH-OVER DEVICE

BACKGROUND OF THE INVENTION

1. Field of the Invention

The present invention relates to a voltage switch-over device.

2. Description of the Prior Art

A method of controlling a voltage switching device is known from EP 0 476 278 A2, in which two storage elements are charged to an appropriate energy value by means of a charger, the energy delivered by a power source being converted from alternating voltage to direct voltage by a power rectifier, thereby establishing a current circuit with a consumer. During the procedure of charging the storage elements, the rating of the energy delivered by the power source is evaluated or determined by a mains evaluating device, and another switchable power rectifier is switched into or out of the power source depending on the rating of the energy delivered.

A rectifier current supply circuit is also known from EP 0 021 714 A, in which two storage elements are powered from a power source and a power rectifier is connected in between, in order to supply a consumer with energy.

SUMMARY OF THE INVENTION

The underlying object of this invention is to provide a voltage switch-over device that provides simple means of switching from one power supply having a given voltage rating to another power supply with a different voltage rating.

This object is achieved by the invention with a voltage switch-over device comprising a first power rectifier having a positive and a negative potential; a charger, the first power rectifier being connected to the charger; a power supply; mains leads connecting the charger to the power supply; a second power rectifier having a positive and a negative potential; two consumers; a mains evaluation unit coupled to the charger, the mains evaluation unit switchably connecting the second power rectifier to the power supply and the consumers; two storage elements; and a first connection between the positive potential of the first power rectifier and the negative potential of the second power rectifier, and a second connection between the negative potential of the first power rectifier and the positive potential of the second power rectifier, a respective one of the storage elements being arranged in each connection; and a respective one of the storage elements being arranged in an independent current circuit supplying a respective one of the consumers.

The advantage of this arrangement is that all the components, such as the power rectifiers, the storage elements, etc., are operated and powered uniformly, both a low and high mains voltages, thereby reducing the cost of manufacturing the voltage switch-over device.

BRIEF DESCRIPTION OF THE DRAWING

The invention will be described in more detail below, with reference to embodiments illustrated in the drawings. Of these:

FIG. 4 is a simplified, schematic illustration of another embodiment of the voltage switch-over device proposed by the invention.

DETAILED DESCRIPTION OF THE PREFERRED EMBODIMENT

First, it should be noted that the same parts described in the different embodiments are denoted by the same reference numbers and the same component names.

Figure 1:
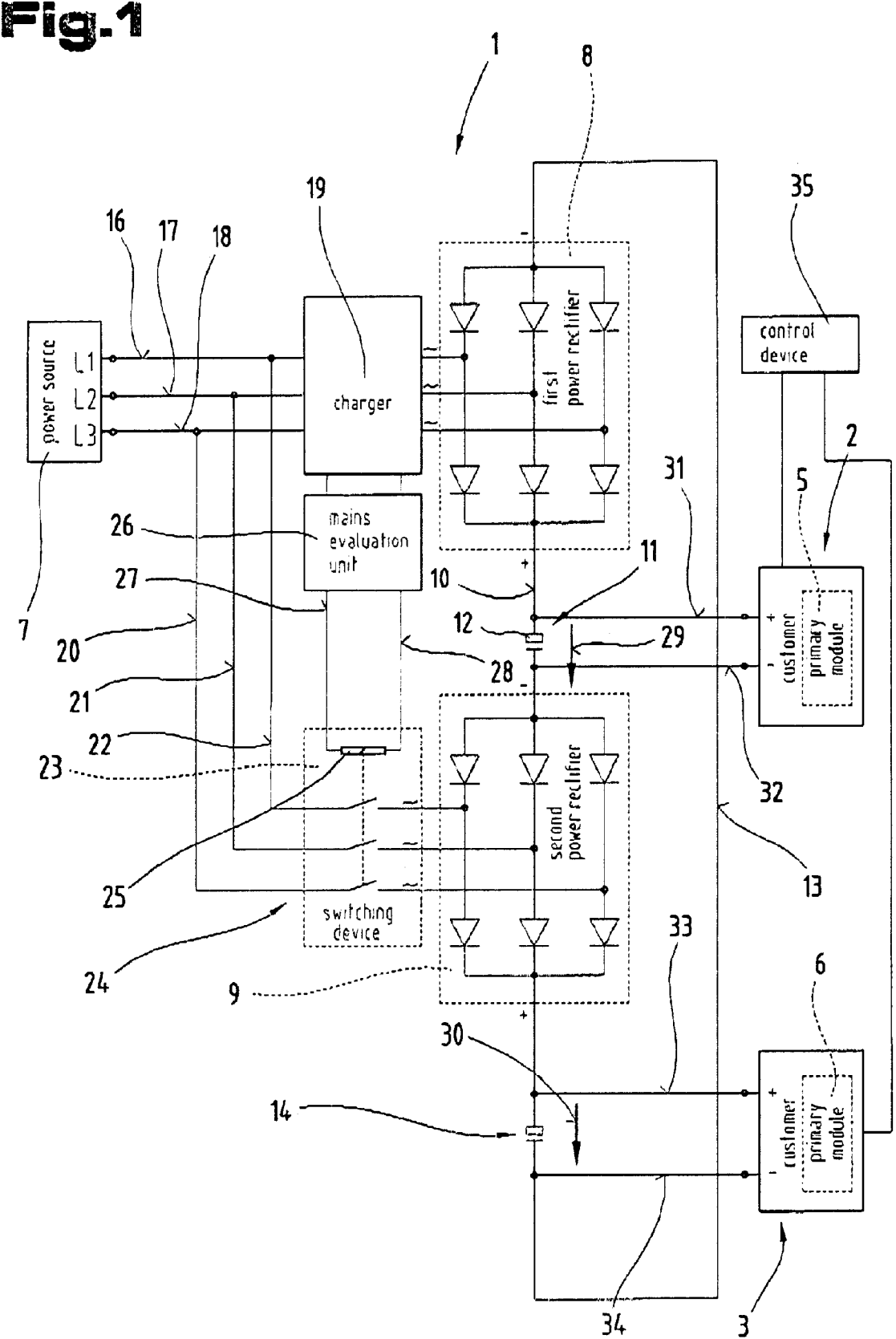
FIG. 1 is a switching diagram of a voltage switch-over device as proposed by the invention, shown in a simplified, schematic form.

FIG. 1 illustrates a voltage switch-over device 1 for one or more consumers 2, 3. The consumer or consumers 2, 3 may be a primary clocked power switching component, for example. To this end, FIG. 1 schematically illustrates a primary module 5, 6 of the primary clocked power switching component. A specific design of the consumer 2, 3 will be described later with reference to FIG. 3.

The purpose of the voltage switch-over device 1 is to evaluate the energy delivered by the power source 7 and operate a switching process depending on the level of power delivered, for example in a single-phase network from 230 V to 400 V or vice versa.

To this end, the voltage switch-over device 1 has two power rectifiers 8, 9 connected in series. The power rectifier 8 is connected via a line 10 to the power rectifier 9, with a storage element 11, in particular a capacitor 12, connected in between, the positive potential of the power rectifier 8 being connected by line 10 to the negative potential of the power rectifier 9.

The positive potential of the power rectifier 9 is connected via a line 13 to the negative potential of the power rectifier 8, another storage element 14, in particular a capacitor, being connected in between, thereby setting up a serial connection between the two power rectifiers 8, 9, each having a storage element 11, 14 connected in between.

The power rectifiers 8, 9 may consist of any rectifier bridge known from the prior art. Clearly, it would also be possible for the power rectifiers 8, 9 to be individual diodes, as schematically illustrated. In the illustrated embodiment, the power source 7 is a multi-phase network, in particular a three-phase network, the power source 7 being connected to the voltage switch-over device 1 by at least three mains leads 16 to 18. Any commercially available mains plug may be used to connect the voltage switch-over device 1 to the power source 7, although these are not illustrated in the embodiment shown here.

In order to rectify the alternating voltage in a manner known from the prior art, the power source 7 is connected to the first power rectifier 8 via the mains leads 16 to 18. In order to prevent any short circuiting between the individual mains leads 16 to 18 due to the presence of the storage elements 11, 14 when the voltage switch-over device 1 is switched on, a charger 19 is provided between the power source 7 and the first power rectifier 8. The purpose of the charger 19 is to charge the individual storage elements 11, 14, in particular the individual capacitors 12, 15, slowly to a corresponding power level when the voltage switch-over device 1 is connected to the power source 7, which will prevent any shorting between the individual means leads 16 to 18. Any charger 19 known from the prior art may be used to charge the capacitors 12, 15.

The other power rectifier 9 is connected to the mains leads 16 to 18 by means of individual mains lines 20 to 22.

Connecting the mains leads 16 to 18 to the other power rectifier 9 via the mains lines 20 to 22 produces a further rectification of the alternating voltage from the power source 7 via the other power rectifier 9. In this may, the serial connection of the two power rectifiers 8, 9 is switched over to the parallel connection. However, to ensure that both switching systems, in particular the serial connection of the two power rectifiers 8 and 9 and the parallel connection of the two power rectifiers 8 and 9, can be used, a switching device 23 is provided for the power rectifier 9 in the mains lines 20 to 22.

The purpose of the switching device 23 is to interrupt the mains lines 20 to 22 by individually controllable switches or contacts 24 so that a serial connection of the two power rectifiers 8, 9 is produced when the switches 24 are open, whereas when the switching device 23 is activated, in other words when the switches 24 are closed, a parallel connection is obtained between the two power rectifiers 8, 9. If using a three-phase network, the switching device 23 may be provided as a three-pole AC switch, for example, in particular as a breaker, so that the individual switches or contacts 24 can be closed or opened when power is applied to an excitation module 25, in particular a coil. Clearly, it would also be possible to use other systems known from the prior art for switching lines, in particular the mains lines 20 to 22. For example, the switching device 23 used for this purpose might be an electronic load relay or individual switches or may be set up as a breaker.

The switching device 23 is controlled from a mains evaluation unit 26 coupled with the charger 19, i.e. the excitation module 25 is connected to the mains evaluation unit 26 via lines 27, 28 so that when power is applied to the lines 27, 28, the excitation module 25 is placed in a state of excitation, enabling the switches or contacts 24 assigned to the excitation module 25 to be closed or opened. It would also be possible to use both opening contacts and closing contacts for the switch 24.

The purpose of the mains evaluation unit 26 is to measure the power delivered by the power source 7 so that the switching device 23 will be activated by the network evaluation unit 26 if a set power value is exceeded. Clearly, it would be possible to use any mains evaluation unit 26 known from the prior art, for example by setting up a voltage measuring unit with an appropriate control unit. Because the network evaluation unit 26 is coupled with the charger 19, when the voltage switch-over device 1 is activated, the mains evaluation unit 26 will monitor the level of energy flowing from the power source 7 simultaneously with the process of charging the storage elements 11, 14 so that the switching device 23 can be activited if the mains evaluation unit 26 measures a power value exceeding a predetermined value.

In order to be able to connect the individual consumers 2, 3, i.e., the primary clocked power switching component, to the voltage switch-over device 1, a current circuit 29, 30 is set up across each storage element 11, 14, i.e. the individual primary modules 5, 6, illustrated schematically, for the primary clocked power switching component are connected to the individual storage elements 11, 14 by lines 31, 32 and 33, 34.

By establishing two current circuits 29, 30, two independent consumers 2, 3 can be operated with the voltage switch-over device 1. By using an appropriate layout of the primary clocked power switching component, it would also be possible to apply energy to only one consumer 2 or 3, in which case the individual primary modules 5, 6 of the power switching component would supply the consumer 2 via a common transformer. If using only one consumer 2 or 3, however, it will be necessary to establish a separate current circuit 29, 30 to ensure that the voltage switch-over device 1 is able to function correctly via each storage element 11, 14.

A control device 35 may be provided as a means of controlling the individual primary modules 5, 6 and the consumers 2, 3. The control device 35 may be a microprocessor unit, for example, which will enable the primary modules 5, 6 to be controlled in a known manner. Clearly, the mains evaluation unit 26 could also be connected to the control device 35 by one or more lines so that the appropriate value needed for the mains evaluation unit 26 to activate the switching device 23 can be set or changed by the control device 35. It would also be possible to connect the charger 19 to the control device 35 so that the charger 19 can forward a control signal to the control device 35 when the individual storage elements 11, 14 are being charged, particularly when the charging process is switched off, to enable the control device 35 to activate the individual primary modules 5, 6 for the consumer or consumers 2, 3.

When the voltage switch-over device 1 is connected to the power source 7, energy flows from the power source 7 to the charger 19. When the charger 19 is activated by the energy flow, the individual storage elements 11 and 14 are charged to a corresponding pre-determined value, i.e. the direct energy flow across the first power rectifier 8 is first interrupted by the charger 19, after which the flow of energy from the power source 7 is switched across the charger 19 and forwarded to the first power rectifier 8, thereby producing a continuous increase in voltage.

Since the switching device 23 is not activated by the mains evaluation unit 26 when the voltage switch-over device 1 is switched on and hence the individual switches 24 are open, energy is prevented from flowing from the mains leads 16 to 18 via the mains lines 20 to 22 to the other power rectifier 9. As a result, the two power rectifiers 8 and 9 are connected in series, i.e. the storage elements 11 and 14 are simultaneously supplied with energy via the charger 19 and hence charged.

Before the charger 19 reaches a point of forwarding full power from the power source 7 to the power rectifier 8, in other words before the energy flow is fully switched through, the mains evaluation unit 26 decides whether the additional power rectifier 9 should be activated via the switching device 23 or not. To this end, a corresponding value is stored in the mains evaluation unit 26 so that, when exceeded by the energy flow, in particular the voltage level, the switching means 23 remains deactivated, thereby producing a serial connection between the two power rectifiers 8, 9 and the storage elements 11, 14. Because the two power rectifiers 8, 9 and the storage elements 11, 14 are connected in series, the individual primary modules 5, 6, which each form a separate current circuit 29, 30 across a respective storage element 11, 14, are supplied with the same quantity of energy and the energy can then be drawn off via the individual current circuits 29, 30. The serial connection of the two storage elements 11, 14 also means that an increase in voltage is prevented in the direct voltage range of the voltage switch-over device 1.

If a power source 7 were used whose flow of energy, in particular voltage level, were below the value stored in the mains evaluation unit 26, i.e. if only one power source 7 were used in the three-phase network illustrated here with a voltage of 3×400 V, the switching device 23 would be activated by the mains evaluation unit 26 after charging the storage elements 11, 14 and switching the full energy flow because the value would be less than that stored in the mains evaluation unit 26. A current circuit would therefore be built up by the mains evaluation unit 26 across the excitation module 25 so that switches 24 would be closed. By closing the switches or contacts 24, energy will flow simultaneously from the power source 7 to the power rectifier 8 and the power rectifier 9, thereby setting up a parallel connection of the two power rectifiers 8, 9 and storage elements 11, 14. As a result of feeding energy across the power rectifiers 8, 9 in parallel, the two storage elements 11, 14 will be supplied separately so that the same quantity of energy is again available to each storage element 11, 14. It would also be possible to provide a timing unit in the mains evaluation unit 26 so that when a pre-settable period has elapsed, the mains evaluation unit 26 could compare the actual flow of energy at this instant with the stored value and the switching device 23 controlled accordingly by the mains evaluation unit 26 if the value is above or below the stored value.

Providing serial and parallel connections for the two storage elements 11, 14 means that, if operating with different power sources 7 having different voltages, it will not be necessary to provide individual components rated for the different power sources 7 and instead the components will have to be rated to handle the maximum power and the maximum anticipated voltage.

If the voltage switch-over device 1 is connected to a power source 7 of 400 V, for example, the mains evaluation unit 26 detects during the powering-up process that a power source 7 is being used whose voltage is above a predetermined desired value and the switching device 23 remains deactivated. The energy supplied by the power source 7 is fed to the two storage elements, 11, 14 via the line 10 and 13, i.e. a full current flow is built up across the two storage elements 11, 14 by the power rectifier 8.

Because the two storage elements 11, 14 are connected in series, the rectified voltage is divided between the two storage elements 11, 14 i.e., each of the two storage elements 11, 14 stores respectively half of the energy supplied. The voltage or current flow is halved since a separate current circuit 29, 30 is built up with a separate consumer 2, 3 or with a common consumer 2 or 3 across each storage element 11, 14, any increase in voltage being prevented by the serial connection of the two storage elements 11, 14.

If this same voltage switch-over device 1 is connected along with components of the same rating to a power source 7 whose maximum voltage is 230 V, for example, the mains evaluation unit 26 will detect during the powering-up process that the voltage of the power source 7 is below the predetermined desired value and the mains evaluation unit 26 will therefore activate the switching device 23, i.e., because the current flow builds up across the excitation module 25, the individual switches 24 are closed, as a result of which a flow of energy is established simultaneously across the mains leads 16 to 18 to the power rectifier 8 and across the mains lines 20 to 22 to the power rectifier 9. Because the individual storage elements 11, 14 are now operating in parallel, the individual storage elements 11, 14 will be supplied with energy via the two power rectifiers 8 and 9 simultaneously, i.e., the storage element 11 is supplied with energy or charged by the power rectifier 8 and the storage element 14 is supplied with energy or charged by the power rectifier 9, the energy fed across the two power rectifiers 8, 9 to charge or supply the two storage elements 11, 14 forming two current circuits 29, 30. The current circuit 29 for the first storage element 11 is formed between the positive potential of the power rectifier 8 and the negative potential of the power rectifier 9, whilst the second current circuit 30 for the storage element 14 is set up between the positive potential of the power rectifier 9 and the negative potential of the power rectifier 8. This quantity of energy, which is stored in the storage elements 11, 14, corresponds to the same quantity of energy as would have been generated had the two storage elements 11, 14 been connected in series with a network having a voltage above the desired value. Because the two power rectifiers 8, 9 are connected in series, the storage elements 11, 14 are charged or supplied by only one power rectifier 8, whereas the other power rectifier 9 is disposed between the two storage elements 11, 14, as a result of which the quantity of energy supplied is divided, in other words, the quantity of energy supplied is halved, i.e., because the consumer or consumers 2, 3 are at the same voltage and have the same current flow or quantity of energy due to the current circuits 29, 30 established via the two storage elements 11, 14, the same consumers 2, 3 or the same primary modules 5, 6 can be used in the same way as they were used before, even with a power source 7 of a lower voltage.

The advantage of a voltage switch-over device 1 of this type resides in the fact that the individual components of the voltage switch-over device 1 only have to be rated for the maximum power required for the consumers 2, 3 without having to make allowance for the fact that the voltage switch-over device 1 can be connected to different power sources 7 with different voltages.

To enable the primary modules 5,6, to build up a current circuit 29, 30 across the two storage elements 11, 14, the control device 35 activates the individual primary modules 5, 6, i.e., a flow current is established via the lines 31, 32 for the current circuit 29 and via the lines 33, 34 for the current circuit 30. To this end, instead of using two different consumers 2, 3, preferably balanced consumers 2, 3, it is also possible to operate a common consumer 2 or 3, which is connected to the two primary modules 5, 6 via a common transformer. An embodiment of this type will be explained in more detail later on with reference to FIG. 3.

Figure 2:
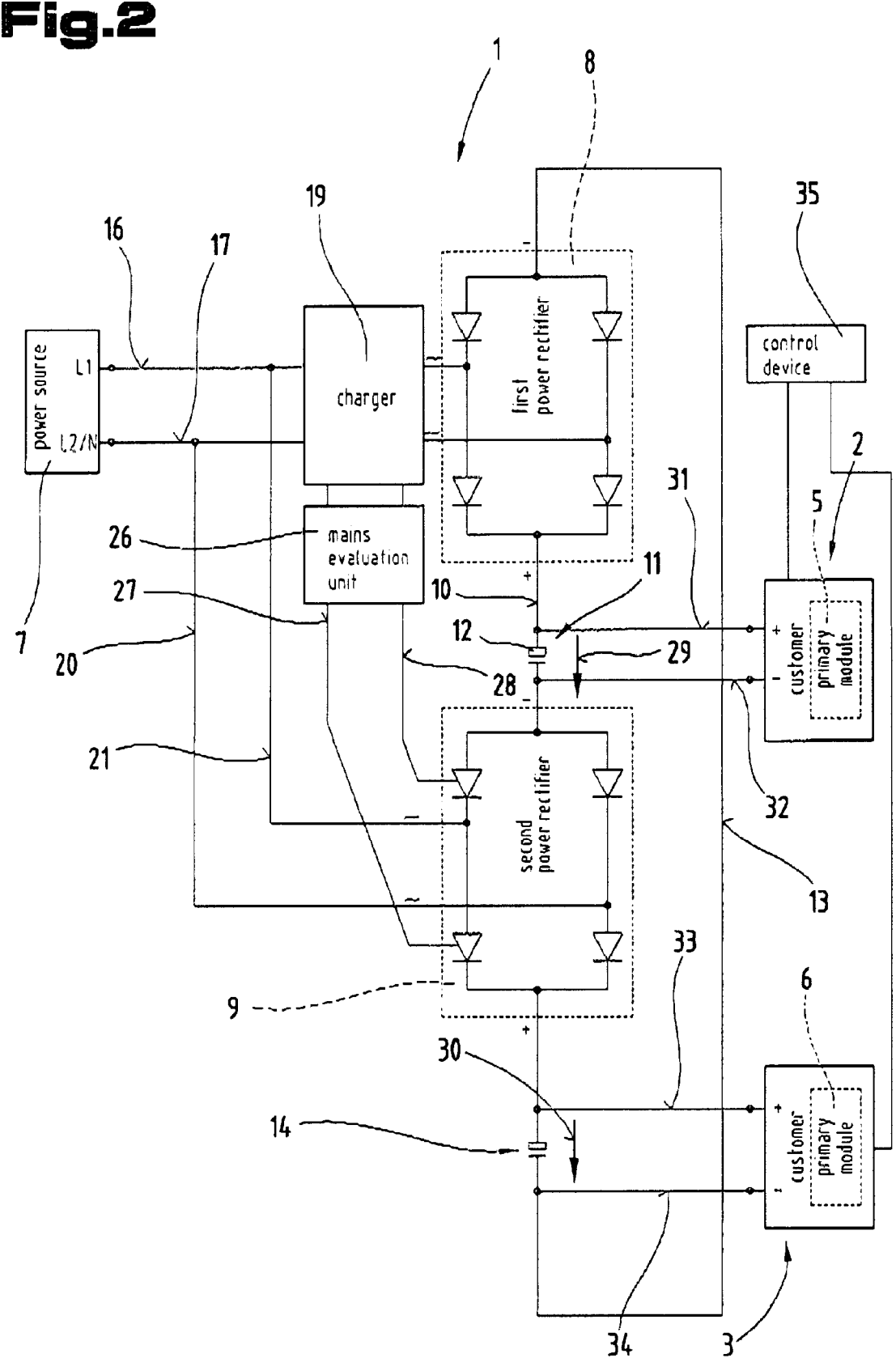
FIG. 2 is a simplified, schematic illustration of another embodiment of the voltage switch-over device proposed by the invention.

FIG. 2 illustrates another embodiment of the voltage switch-over device 1.

The difference as compared with the voltage switch-over device 1 illustrated in FIG. 1 is the fact that the power source 7 in this case is a single- or two-phase network, i.e., instead of the three main leads 16 to 18, a maximum of two mains leads 16, 17 is used and the other individual components such as the power rectifiers 8, 9 and the charger 19 are rated for a corresponding single-phase or two-phase network. However, these components are known from the prior art and a more detailed explanation will therefore not be given.

Another difference resides in the fact that a controllable power rectifier 9 is used instead of the switching device 23, i.e., instead of the power rectifier 9 being connected to the switching device 23 as illustrated in FIG. 1, it is possible to control the power rectifier 9 directly. The method used to control the power rectifier 9 is again a known method and will therefore not be explained in any further detail.

This layout of the voltage switch-over device 1 means that there is no need for the additional switching device 23, thereby significantly reducing the structural dimensions.

Figure 3:
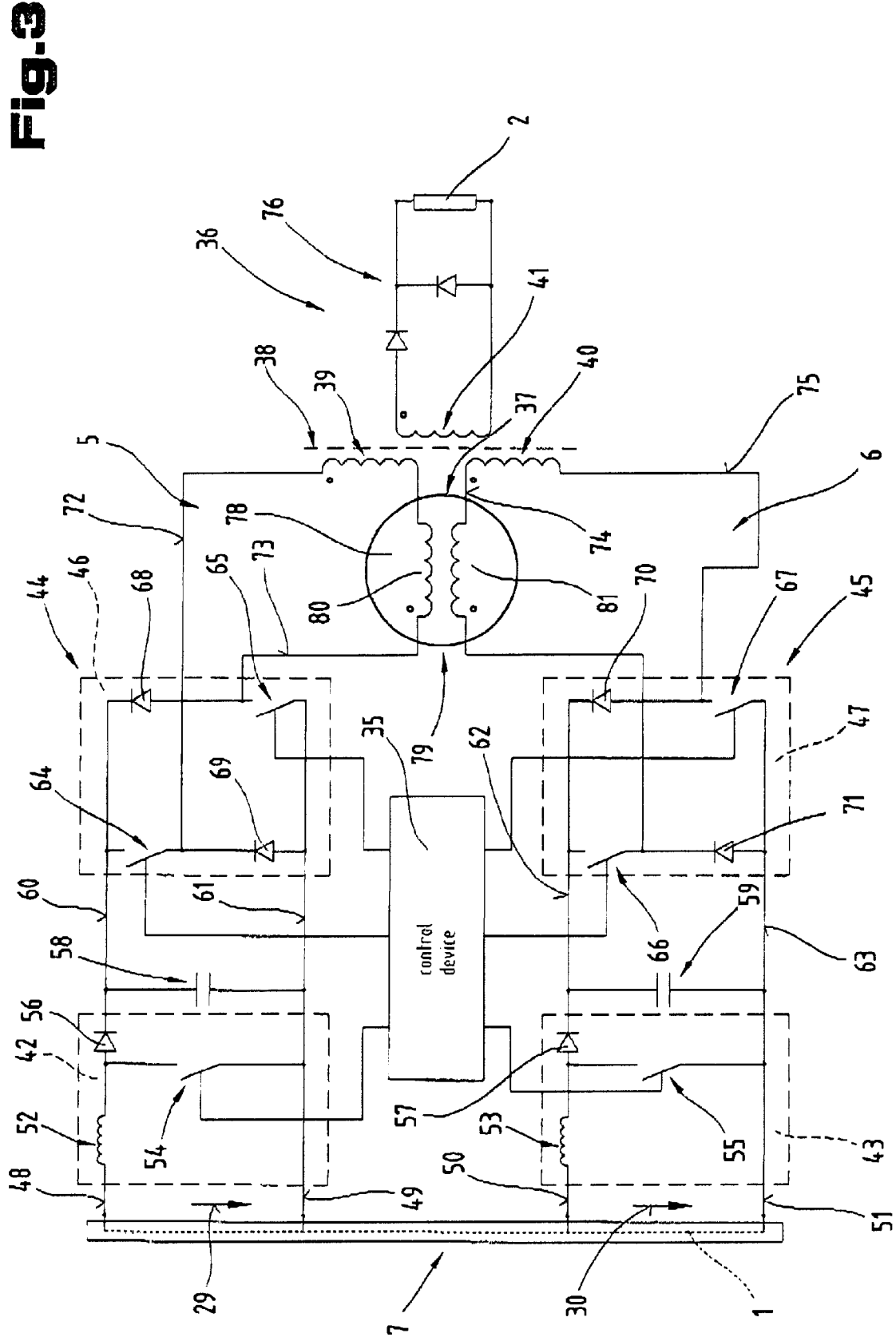
FIG. 3 is a simplified, schematic illustration of one embodiment of a consumer connected to the voltage switch-over device illustrated in FIGS. 1 and 2.

FIG. 3 shows a network diagram for the primary clocked power switching component 4 described above, with the two primary modules 5, 6 and a common secondary module 36. Clearly, it would also be possible for any consumer 2, 3 or any design of power switching component to be connected to the individual circuits 29, 30 of the voltage switch-over device 1.

However, the embodiment of the power switching component chosen as an example is one in which a balancing device 37 is used in order to balance the two independent primary modules 5, 6, in particular the two current circuits 29, 30. This being the case, if different loads are applied to or different amounts of energy are drawn off from the two current circuits 29, 30, the balancing device 37 will balance the energy between the primary modules 5, 6, i.e., a balance will be struck between the different loads applied by the storage elements 11, 14 to the primary modules 5, 6 via the balancing device 37.

The two primary modules 5, 6 are connected to the secondary module 36 via a transformer 38, the transformer 38 having a respective primary winding 39, 40 for each primary module 4, 5 and at least one secondary winding 41 for the secondary module 36.

In order to be able to supply energy to the power switching component, in particular current and voltage, the power switching component is connected to the power source 7 via the voltage switch-over device 1. The power source 7 may be a public mains network or a generator, the voltage switch-over device 1 being schematically illustrated by broken lines. The function of the voltage switch-over device 1 has been described in connection with the embodiments described above.

The two primary modules 5, 6 consist of a boost chopper 42, 43 and a switching device 44, 45, such as a half-bridge 46, 47, for each primary winding 39, 40 of the transformer 38, but no further explanation with regard to the operation is necessary since the boost choppers 42, 43 and the switching devices 44, 45 are known from the prior art. Instead of using a boost chopper and a half-bridge, it would also be possible to use a buck chopper and a full bridge, for example, or other component units as a means of supplying the primary windings 39, 40 of the transformer 38 with energy.

The two primary modules 5, 6 are connected to the individual current circuits 29, 30 of the voltage switch-over device 1 by means of power lines 48 to 51, as a result of which the two primary modules 5, 6 can be supplied with energy via the current circuits 29, 30 from the power source 7. To this end, the alternating voltage supplied via the voltage switch-over device 1 is rectified by means of the power rectifiers 8, 9 and then fed to the primary modules 5, 6 via the power lines 48 to 51.

The two boost choppers 42, 43 are of identical design and each consists of an inductance 52, 53, a switching element 54, 55, a diode 56, 57 and a back-up capacitor 58, 59, the individual components being connected to one another in a known manner. In order to be able to control the switching elements 54, 55, the primary clocked power switching component 4 has a common control device 35. To control the individual switching elements 54, 55, the primary modules 5, 6 are provided with individual measuring devices for detecting the voltage and the current flow and are connected to the control device 35 to enable the two switching elements 54, 55 to be activated by the control device 35. The individual measuring devices have not been illustrated in order to retain clarity.

The purpose of the two boost choppers 42, 43 is to boost the direct voltage supplied by the power source 7 and the voltage switch-over device 1 by an appropriate factor so that the switching devices 44, 45 connected to the two boost choppers 42, 43 via lines 60 to 63 can be supplied with a corresponding amount of energy. To do this, the switching elements 54, 55 are closed by the control device 35 so that a short circuit is produced between the power lines 48, 49 and 50, 51, thereby storing energy in the inductance 52, 53. The control device 35 then opens the two switching elements 54, 55 so that the stored energy is able to flow across diodes 56, 57 to the back-up capacitors 58, 59. Providing the back-up capacitors 58, 59 means that, when the two switching devices 44, 45 are activated, in other words in the event of a short circuit, the switching devices 44, 45 are supplied with energy from the back-up capacitors 58, 59 so that an uninterrupted supply of energy is fed to the switching devices 44, 45.

It would also be possible to dispense with the boost choppers 42, 43 in a power switching component 4 of this type, in which case the switching devices 44, 45 can be connected via the back-up capacitors 58, 59 directly to the voltage switch-over device 1 and its two current circuits 29, 30. The two back-up capacitors 58, 59 could also be dispensed with since an energy buffer can be set up across the storage elements 11, 14 and hence the direct voltage smoothed by the storage elements 11, 14 in the case of a rectified alternating voltage.

In the illustrated embodiment, the switching devices 44, 45 are half-bridges 46, 47, each consisting of two switching elements 64 to 67 and two diodes 68 to 71. In a known manner, by activating the two switching elements 64, 65 and 66, 67, an alternating voltage with a higher frequency can be generated from the rectified direct voltage, enabling the generated alternating voltage to be transmitted across the transformer 38. Diodes 68, 69 and 70, 71 are connected in series to the switching elements, resulting in de-magnetization when the switching elements are opened or de-activated. Instead of the half-bridge 46, 47, it would also be possible to provide a full bridge so that, instead of two switching elements 64, 65 and 66, 67, four switching elements 64 to 67 are provided in each switching device 44, 45, thereby enabling the control device 35 to operate any reversal of the current flow via the primary windings 39, 40.

In order to supply the primary windings 39, 40 of the transformer 38 with energy from the primary modules 5, 6, the two primary windings 39, 40 are connected by connecting lines 72, 73 and 74, 75 between the switching element 64, 65 and 66, 67 and the serially connected diode 68, 69 and 70, 71 of each switching device 44, 45, as is known.

Different consumers 2 or 3 can now be connected to the secondary module 36, in particular the secondary winding 41. The consumer might be a welding torch, for example. By connecting the welding torch via the secondary winding 41, energy can be supplied by the power switching component 4 enabling a welding process to be carried out. In the illustrated embodiment, the consumer 2, 3 is illustrated as a simple resistor. In order to make a direct voltage available on the secondary side of the transformer 38, a rectifying circuit 76 is connected to the secondary winding 41.

So that the two primary modules 5, 6 can operate in a balanced manner, i.e., the two primary windings 39, 40 are supplied with the same flow of energy, a balancing device 37 is provided in the primary modules 5, 6. The balancing device 37 is a transforming device 78, in particular a balanced transformer 79. The balanced transformer 79 has a winding 80, 81 for each primary module 5, 6, the windings 80, 81 of the balanced transformer 79 being provided in series with the primary windings 39, 40 of the two primary modules 5, 6 in the connecting lines 72, 73. The two windings 80, 81 of the balancing transformer 79 are wound in the same direction in the illustrated embodiment. However, in order for energy to be transformed between the two primary modules 5, 6, the windings 80, 81 of the balanced transformer 79 are connected in the primary module 5 to the end of the coil of the primary winding 39 and at the other primary module 6 to the start of the coil of the primary winding 40, or vice versa. The beginning of the coil of the individual windings 80, 81 and primary windings 39, 40 or the secondary winding 41 used are shown by a dot in the drawings.

If surplus energy or different loads are generated on the back-up capacitors 58, 59 or the storage elements 11, 14 by the power source 7, the energy is balanced between the two primary modules 5, 6, i.e., because of the different magnetic fields in the windings 80, 81 due to the different flow of energy through the windings 80, 81, half of the difference of the surplus energy is transferred to the other primary module 6 or 5. By transferring the surplus energy or the difference in the energy surplus in this manner, the winding 80 or 81 of the balanced transformer 79 operates with a lower quantity of energy supplied as an additional energy source so that the two quantities of energy are added to the power source 7 or the back-up capacitors 58, 59 and the additional power source 7 formed by the winding 80 or 81. A the primary module 5 or 6 with the higher quantity of energy supplied by the power source 7, the transferred energy is subtracted from the quantity of energy delivered so that the same quantity of energy or the same voltage is applied to the two primary windings 39, 40 of the transformer 38.

However, in order to be able to apply this energy balancing process in both directions, the two windings 80, 81 of the balanced transformer 79 must have the same number of turns in order to prevent any increase or reduction in the quantity of energy transferred. The advantage of providing the balancing device 37 in the form of the balanced transformer 79 resides in the fact that by balancing the energy at the two primary windings 39, 40 of the transformer 38, the two primary windings 39, 40 are activated uniformly, preventing unbalanced operation of the transformer 38 and as a result reducing any losses which might occur on the transformer 38 in the form of heat energy. Another advantage in using a power switching component 4 of this type is that the individual components used to supply the consumer 2, 3 may be made to smaller dimensions because, by using two primary modules 5, 6, a dual energy source is set up for the consumer 2, 3. In the case of known power switching components 4, the transformer 38 is preferably activated by one primary module 5 or 6 only, which means that in order to be able to apply the same quantity of energy, the primary module 5 or 6 has to be supplied with a correspondingly high quantity of energy and the components therefore have to be of large enough dimensions to ensure a fault-free energy transfer. With the illustrated embodiment of the power switching component, the quantity of energy in each primary module 5, 6 can be halved, the energy quantity then being applied jointly across the transformer 38 so that the consumer 2, 3 can in turn be supplied with the same quantity of energy.

Providing the balanced transformer 79 means that, if the load of the primary modules 5, 6 is different, more energy is drawn off from the primary module 5, 6 with the higher amount of available energy so that the two primary windings 39, 40 of the transformer 38 are supplied uniformly for the energy transfer, i.e., the balanced transformer 79 transfers energy from one primary module to the other primary module, balancing the energy at the primary windings 39, 40 of the transformer 38. If, for example, the primary module 5 is supplied with a voltage of 350 V, i.e., the back-up capacitor 58 is charged to 350 V, and if the primary module 6, in particular the back-up capacitor 59, is supplied with a voltage of 250 V, for example, there is a voltage difference of 100 V between the two primary modules 5, 6. By activating the individual switching elements 64 to 67 of the switching devices 44, 45, these voltages, lying at the back-up capacitor 58, 59, would be forwarded to the primary windings 39, 40 of the transformer 38 if there were no balancing device 37, which would result in an imbalance at the transformer 38 since each primary winding 39, 40 would be supplied with a different voltage, causing high losses during transfer from the primary side to the secondary side of the transformer 38.

By providing the balancing device 37 with the transforming device 78, the energy in the primary modules 5, 6 is balanced. Because there is a difference of 100 V in the voltage, this voltage is halved by means of the balancing device 37 and transferred from the primary module 5 via the balanced transformer 79 to the other primary module 6, thereby balancing the energy at the primary windings 39, 40. In the event of such a difference of 100 V, for example, a voltage of 50 V is transferred from the primary module 5 via the balanced transformer 79 to the other primary module 6 so that the two primary windings 39, 40 are each supplied with a voltage of 300 V, thereby bringing about a balance and giving rise to a transfer across the transformer 38 without losses. The energy can also be balanced in this manner in the other direction so that the energy can be transferred from the primary module 6 to the primary module 5.

Furthermore, several primary modules 5, 6 operating in parallel with one another can be balanced by means of an appropriate balanced transformer 79 with a winding 80, 81 for each primary module 5, 6 and it is therefore possible to supply a consumer 2, 3 from several primary modules 5, 6 at any time. It would also be possible to use a separate secondary winding 41 for each primary winding 39, 40, each having a separate, independent consumer 2, 3. If the balancing device 37 is used with a system of this type, as will be demonstrated with the embodiments described below, the energy can be balanced between the individual primary modules 5, 6 to prevent energy being drawn off unevenly from the primary modules 5, 6.

The windings 80, 81 of the balanced transformer 79 could also be wound in a reverse winding direction. To this end, the windings must be connected with the primary windings 39, 40 of the transformer 38 in such a way that both windings 80, 81 are connected in series either at the start of the coil of the primary windings 39, 40 or at the end of the coil of the primary windings, 39 40. Reversing the winding direction of the primary winding 39 or 40 relative to the primary winding 40 or 39 will produce a reverse transfer of energy, again producing what might be termed an energy source to feed the primary modules 5 or 6. However, if taking this approach, care should be taken to ensure that the windings 80, 81 of the balanced transformer 79 are connected to the primary windings 39, 40 of the transformer 38 according to their winding direction.

FIG. 4 illustrates another embodiment of the voltage switch-over device 1, the same reference numbers being used to denote the same parts as those used for the embodiments described above.

In this embodiment, the voltage switch-over device 1 is a compact unit and the changeover to supplying the two storage elements 11, 14 via the power rectifiers 8, 9 is not operated automatically by the mains evaluation unit 26 but has to be operated manually by a user.

The compact unit is designed in such a way that the individual electronic components are housed in a casing so that a user does not have direct access to the electronic components. However, in order to be able to connect the individual components such as the power source 7 and the consumers 2, 3, in particular the power switching component 4, to the voltage switch-over device 1, the compact unit has individual mechanical terminals for connecting the individual external components. To this end, the power source 7 may be connected to the voltage switch-over device 1 by means of inputs 82 to 84 via the mains leads 16 to 18. The consumers 2, 3 are connected to the voltage switch-over device 1 by means of two outputs 85, 86 and 87, 88 so that the outputs 85, 86 from the first current circuit 29 whilst the outputs 87, 88 from the other, second current circuit 30.

The illustrated embodiment has a terminal block 89 through which the mains lines 20 to 22 are run so that the mains lines 20 to 22 can be interpreted using the terminal block 89 in a known manner. The mains lines 20 to 22 are connected directly to the mains leads 16 to 18 of the first power rectifier 8 and directly to the other power rectifier 9. Since a terminal block 89 is provided for the mains lines 20 to 22, the mains evaluation unit 26 and the switching device 23 of the voltage switch-over device 1 described in relation to FIG. 1 can be dispensed with.

By using one of the bridges 90 to 92 provided for each mains line 20 to 22, shown by broken lines, the operator or user has the option of connecting the two power rectifiers 8 and 9 to one another, i.e., by using the bridges 90 to 92, the energy supplied by the power source 7 can be simultaneously applied to the power rectifier 8 and the other power rectifier 9. However, for this purpose, it is of advantage if another charger is provided between the terminal block 89 and the other power rectifier 9 to prevent the quantity of energy applied directly to the storage elements 11, 14 from causing a corresponding short circuit or inrush of current.

By using a voltage switch-over device 1 of this design, a user can independently adapt to the power source 7 used, i.e. during operation of the voltage switch-over device 1 or a piece of equipment integrated in the voltage switch-over device 1, a user can adapt to the national mains specifications before-hand by switching or connecting the terminal block 89 accordingly by means of commercially available bridges 90 to 92. Instead of using a terminal block 89, it would, of course, also be possible to use a mechanical switching device, in which case the user would simply operate the switch in order to switch the voltage switch-over device 1 to operate at a mains voltage of 400 V or a mains voltage of 230 V, for example.

A voltage switch-over device 1 of this type may be used in battery chargers and other equipment or systems which are operated by a public mains supply, for example, which means that equipment fitted with this voltage switch-over device 1 can be used worldwide simply by switching the terminal block 89 or by means of the automatic switching system described in FIG. 1 in connection with the switching device 23 in order to adapt to the different voltages at which the public mains supply systems operate.

In the illustrated embodiment, the other power rectifier 9 is switched or connected to the power source 7 by means of the terminal block 89. If the other power rectifier 9 is not needed, in other words on a mains voltage operating at 400 V, for example, the user can remove the individual bridges 90 to 92 for the mains lines 20 to 22 so that the voltage switch-over device 1 will operate via the power rectifier 8 only. However, if the user of this equipment wanted to operate this equipment with an integrated voltage switch-over device 1 of this type on a different mains supply, in particular a power source 7 with a lower voltage rating, such as 230 V for example, he can simply switch the terminal block 89. In other words, the terminals of the terminal block 89 are connected via the bridges 90 to 92, as illustrated by broken lines, in order to operate the equipment at the lower voltage, since switching or connecting the terminal block 89 will provide a direct connection of the other power rectifier 9 to the mains leads 16 to 18 so that the two storage elements 11 and 14 are charged via the two power rectifiers 8, 9 in parallel, as described in relation to FIG. 1.

What is claimed is:

1. A voltage switch-over device comprising
   (a) a first power rectifier having a positive and a negative potential,
   (b) a charger,
     (1) the first power rectifier being connected to the charger,
   (c) a power supply,
   (d) mains leads connecting the charger to the power supply,
   (e) a second power rectifier having a positive and a negative potential,
   (f) two consumers consisting of balanced primary modules activating at least one transformer,
   (g) a mains evaluation unit coupled to the charger,
     (1) the mains evaluation unit switchably connecting the second power rectifier to the power supply and the consumers,
   (h) two capacitors,
   (i) a first connection between the positive potential of the first power rectifier and the negative potential of the second power rectifier, and a second connection between the negative potential of the first power rectifier and the positive potential of the second power rectifier,
     (1) a respective one of the capacitors being arranged in each connection, and
     (2) a respective one of the capacitors being arranged in an independent current circuit supplying a respective one of the consumers, and
   (j) a control device connected to the consumers, the control device being a micro processor.

2. The voltage switch-over device of claim 1, further comprising a switching device connecting the second power rectifier to the main leads.

3. The voltage switch-over device of claim 2, wherein the mains evaluation unit is coupled to the switching device.

4. The voltage switch-over device of claim 2, wherein the switching device is an electronic load relay or a triac.

5. The voltage switch-over device of claim 1, wherein the power supply is a single-phase or a multi-phase network.

6. The voltage switch-over device of claim 1, wherein the power rectifiers are controllable rectifier bridges.

7. The voltage switch-over device of claim 1, wherein the balanced primary modules with the capacitors form the independent current circuits.

* * * * *